(12) United States Patent
Eberhardt et al.

(10) Patent No.: US 6,840,184 B2
(45) Date of Patent: Jan. 11, 2005

(54) METHOD AND APPARATUS FOR THE TREATMENT AND UTILIZATION OF SOLID AND LIQUID WASTE MIXTURES

(76) Inventors: Claus Eberhardt, Ringweg 1, D-71287 Weissach-Flacht (DE); Bernd Ruediger Kipper, Buchenweg 7, D-39167 Irxleben (DE); Ulrich Stegmann, Fritz-Machicke-Strass 14, D-39128 Magdeburg (DE); Jochen Zingelmann, Im Sportfeld 14, D-53639 Kocnigswinter (DE)

( * ) Notice: Subject to any disclaimer, the term of this patent is extended or adjusted under 35 U.S.C. 154(b) by 0 days.

(21) Appl. No.: 10/744,636

(22) Filed: Dec. 23, 2003

(65) Prior Publication Data
US 2004/0134395 A1 Jul. 15, 2004

(30) Foreign Application Priority Data
Dec. 23, 2002 (DE) .......................................... 102 61 537

(51) Int. Cl.[7] .................................................. F23B 7/00
(52) U.S. Cl. ...................... 110/341; 110/342; 48/197 R

(58) Field of Search ................................ 48/111, 197 R; 202/99; 110/346, 233, 341, 342, 229; 201/5, 6, 25

(56) References Cited

U.S. PATENT DOCUMENTS

| | | | | | |
|---|---|---|---|---|---|
| 4,152,122 A | * | 5/1979 | Feldmann | ...................... | 48/111 |
| 4,437,419 A | * | 3/1984 | Hertel | ........................ | 110/259 |
| 4,935,038 A | * | 6/1990 | Wolf | ............................ | 48/209 |
| 5,862,762 A | * | 1/1999 | Sekiguchi et al. | .......... | 110/346 |
| 6,202,577 B1 | * | 3/2001 | Boguslavsky et al. | ...... | 110/346 |

* cited by examiner

Primary Examiner—Kenneth Rinehart
(74) Attorney, Agent, or Firm—Karl Hormann

(57) ABSTRACT

A method and an apparatus for treating and utilizing waste materials and mixtures thereof in multiple steps resulting in a high-yield utilization particularly of organic components of the waste for generating kinetically useful energy. The waste materials are sorted by classes, principally between organic and non-organic, e.g. metallic and ceramic, substances. The organic substances are briquetted and gasified, the produced gas being utilized for the direct and indirect generation of electricity and heat.

3 Claims, 8 Drawing Sheets

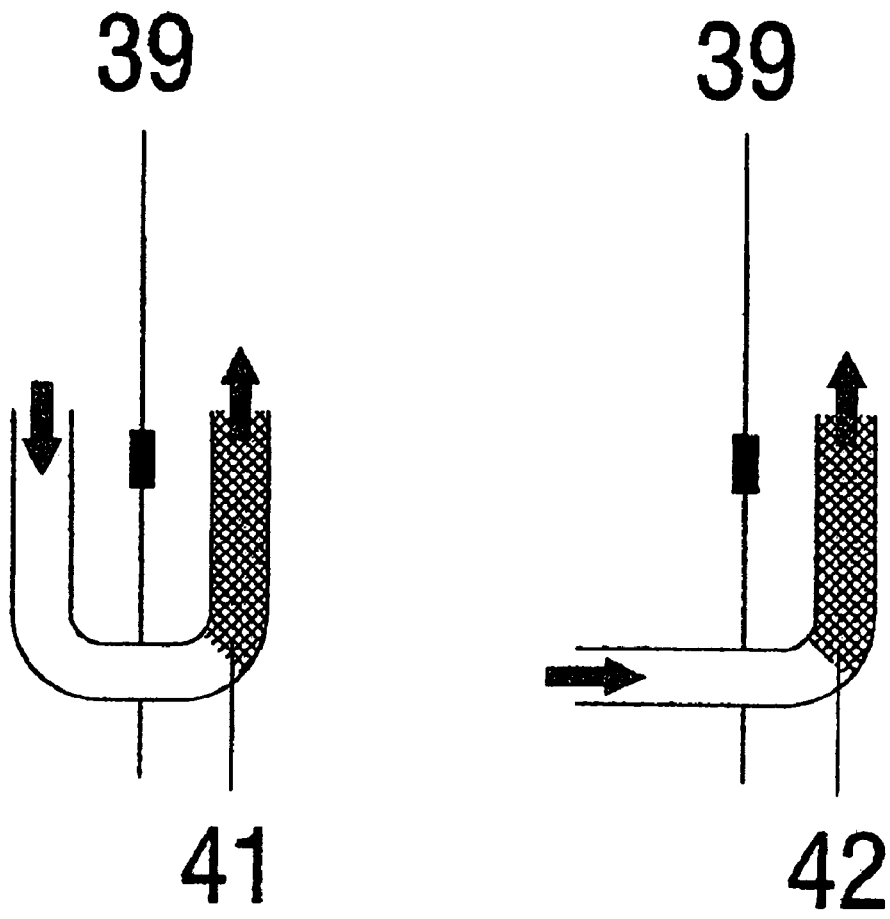

US 6,840,184 B2

METHOD AND APPARATUS FOR THE TREATMENT AND UTILIZATION OF SOLID AND LIQUID WASTE MIXTURES

BACKGROUND OF THE INVENTION

1. Field of the Invention

The invention, in general, relates to a method and an apparatus for the treatment and utilization of solid and liquid waste mixtures and, more particularly, the invention relates to a method and a complex apparatus consisting of a plurality of special components for the treatment and utilization of solid and/or liquid waste or mixtures thereof. The invention is particularly directed to a high-yield energetic recycling of the organic components of such solid and liquid waste.

2. The Prior Art

A process is known for the material and energetic utilization of residual and waste materials requiring initially to fabricate a bale of fuel consisting of waste materials of industrial origin which then gasified by the ARLES process, which is a Noel technology derived entrained gasification, whereby the gas thus produced requires desulfurizing by use of primary energy. The residual ash constitutes a fusion granulate. The cleansed and desulfurized fuel gas thus produced is then combusted in a thermoelectric power plant for producing energy (German patent specification DE 198 53 713 C2). This method is useful only in connection with waste of industrial origin and is waste recycling process but, rather, a waste elimination process.

Another process and another apparatus for the thermal utilization and disposal of solid, liquid and pumpable non-homogeneous combustible mixtures of waste and for the thermal purification of contaminated materials in a fluidized bed combustion is a conventional fluidized bed waste combustion system primarily for the disposal of solid and liquid contaminants by means of a fluidized bed combustion (German patent specification DE 198 59 052 A1). The disadvantage of this system as well as of the MBA process is that for every ton of waste which can either be processed further or deposited in a waste dump it yields no more than 0.3 tons of reusable residue. Usually, the ashes elute and release heavy metals into the hydrosphere. Overall, this kind of technology results in very high and, in the case of many input materials, uncontrolled emissions.

Furthermore, a process is known for the mechanical-biological treatment of bulky and household waste like residential waste involving an energetic and material combination of the biological and physical processes (German patent specification DE 101 25 408 A1). This constitutes a conventional MBA process producing a biological gas which is converted by known biological power plant technology generating an exhaust gas.

Sorted out residue is either subjected to further treatment in a partially known manner or is deposited in a waste dump. Scrap which does not decompose must be subjected to further postprocessing.

At 0.4 tons per ton of waste, the residue which either requires further processing or must be deposited in a waste dump is relatively high. 40% of the input cannot be put into a waste dump and must be treated further by complex processes. Upon contact with water, deposited material from this process will become biologically active again and generate the undesired gas mixture of methane and other gases detrimental to the climate.

OBJECTS OF THE INVENTION

It is an object of the invention to provide a method of processing solid and liquid mixtures of waste and a method of utilizing the processed waste.

A further object of the invention resides in the provision of an apparatus for practicing the method.

A still further object of the invention resides in the provision of an apparatus for producing very high quotas of reusable materials with practically no residue requiring deposit in waste disposal dumps.

Yet another object of the invention is to provide apparatus by means of which the principle of total waste avoidance is almost completely realized.

SUMMARY OF THE INVENTION

In the accomplishment of these and other objects, the invention, in a first embodiment thereof, provides for a method of treating and utilizing solid and/or liquid waste materials and/or mixtures thereof including:

a first increment of removing from the mixture of waste materials visually and manually detectable components and of separating them according to classes such as metal, glass, plastic, paper, compounds, composite materials and others, initially subjecting the stream of material to be processed to pre-drying in a drying device and purifying the exhaust gas laden with water vapor and vaporizable materials by a (hereafter "biofilter"), removing from the substantially deodorized material in a first sieving device mineral dirt such as sand, earth and small pieces, removing iron and non-ferrous metals in a metal separator and separating them manually or by automatic systems on a sorting conveyor belt, storing the sorted materials according to material classes in separate equal-level collection containers for transport to conventional salvaging facilities;

a second increment including reducing the non-sorted remaining material to a granular size of about 150 mm to 250 mm and extracting therefrom, separated as iron and non-ferrous metals, any further metallic components, removing from the material any residual moisture in a second drying device and thereafter subjecting the material to a second sieving stage having a mesh size 50% smaller than that of the first sieving device and floating the sifted material in a floatation, subjecting the material thus freed of any metal scrap to compaction and simultaneously further reducing the sifted residue for removing any further metallic components, combining the further reduced material with the floated material such that the remaining material is almost exclusively organic, increasing the moisture content of the organic material thus obtained from the floated and the further reduced materials to a level specific to the process by a computer-controlled addition of fluid such as biological sludges and other slurries and parameters determined by moisture sensors and conveyor scales, compaction to Briquettes such it leads to heating of the material composition to more than 150° C., and a third increment of producing an energetically useful tar-free gas from the thus-produced briquettes by means of a gasification reactor at a gasification temperature of about 300° C. to 450° C. and by passing the gas over a burning bed of coke of a temperature of about 1,000° C. to 1,400° C. by initially feeding the briquettes thus produced to the gasification process by means of a rotary vane feeder as well as oxygen from the air and/or water vapor, the water vapor being produced in an annular gap between the inner and outer shells of the gasification reactor and distributed through openings in the upper and lower sections of the gasification reactor sections as well as through distribution devices in the reactor, the amount of the water vapor being controlled by sensors mounted within the reactor for monitoring pressure, temperature, mass flow and chemical composition of the gas, the gas, following passage over the conveyor weigher or scale, being diverted through openings below the gasification reactor and being thereafter rapidly cooled to 30° C. to 60° C., scrubbed and dried, and a fourth process increment of directly generating from the gas heat energy by means of a gas burner and/or generating electric energy by means of a combustion engine coupled to a generator and heat energy from the hot exhaust of the gas treatment, engine cooling and engine exhaust gas and/or catalytically generating electric energy in a fuel cell by oxidizing oxidizable components contained in the gas and by way of heat exchangers utilizing the hot exhaust from the fuel cell exhaust air as heat energy, and in an auxiliary increment, processing the cooling water, the drying water from exhaust air and exhaust vapor and the scrubbing water in the circuit in a water treatment system, with the dirt mixtures thus generated being added as input material to the materiel prior to its pressing to Briquettes and the exhaust air being purified in a biological filtration device.

In a further embodiment, the invention provides for an apparatus for practicing the method described supra comprising modular the main structural components of a receiving unit, a device for pre-drying, a device for pre-sieving, a device for separating the metal, a sorting device, a collection container system including storage containers, pre-shredder including a device for metal separation, a drying device, a sieving device, an after-shredder including a metal separation device, a floatation device, a briquetting device, a biofilter, a water treatment device, conveyor systems, gasification reactor, combustion engine with an electric generator, burner for the direct generation of heat or a gas oxidation or fuel cell, the sorting device being a manually or automatically driven conveyor belt sorting system with an advance first drying device, first sieving device and device for removing metal and having associated therewith collection and storage containers for classes of materials such as metal, glass, plastic, paper, cardboard and/or composite materials, a biofilter being arranged at the output of the exhaust gas and provided with mechanical and electrostatic filter elements as well as with microbe cultures and spray nozzles for water and nutrient solutions for injection into the biofilter, following the biofilter, a shredding device for pre-shredding material not sorted out and a device for separating metallic components as well as a second sieving device which, relative to the first sieving stage, has a mesh gage reduced by 50% and the sieving output of which is connected to floatation device by means of a conveyor belt provided with an after-shredding device including a metal separation feature, the floatation device comprising a floatation vat with an inclined bottom provided with pressurized air nozzles of predetermined spray characteristics for whirling the floating material and in which a collection channel and conveyor screws for the sediment of minerals are disposed opposite the mineral input position, the organic materials from the floatation device and from the after-shredding device being together conveyed to a briquetting device consisting of a compacting device and a homogenizing device by a conveyor belt by way of a conveyor scale and a moisture sensor, the conveyor scale and the moisture sensor being connected, by way of a process computer, to a dispensing device for feeding liquids and/or slurries, the briquetting device, which may be provided with a bunker for the intermediate storage of the Briquettes, being connected by a conveyor system with a gasification reactor, which is a fixed-bed shaft reactor and which is provided with a rotary vane feeder for the briquettes and into the upper reactor section of which pipe conduits and pipe conduits with distributor systems for air and/or water vapor and/or gas are entering, the reactor core being lined by ceramic and clad such that a water-tight annular gap is formed which is connected to the water input, a plurality of air inputs being provided in the lower section of the reactor core and the bottom of the gasification reactor being conically structured with the tip of the cone pointing upwardly and the lower end being closed by an annular moveable grid for removing ashes by means of a lock, a pipe being arranged below the reactor core laterally thereof and connected to an opening in the outer surface of the gasifier, the opening being in turn connected by a pipe to a gas cooler, gas scrubber and a gas dryer, measuring sensors for monitoring different parameters such a pressure, temperature, mass flow, filling levels and chemical composition of the produced gas being provided in the gasification reactor for the control of air and vapor quantities, the water treatment system consisting of containers with input and output channels being provided with a plurality of chambers divided by separating walls with overflows, such as the input chamber with measuring sensors for detecting process-specific parameters and several subsequent sedimentation chambers for sedimenting materials and a subsequent further volatile substance separator having an intake by way of an upper pipe nipple with a coalescence separator for water and/or nutrient solutions for injection into the made of a pipe with an internal wire mesh, one of the chambers being structured as a mixing and measuring chamber with a stirring device for precipitating suspended materials and dissolved materials by precipitants and flocculants, a biofilter at the output of the first and second drying devices equipped with filter cloths and/or other biological structures and/or centrifuge and/or electrostatic structural elements, microbes being also present on a structure forming support material for metabolizing organic and inorganic materials, and with spray nozzles biofilter.

The method in accordance with the invention for the almost complete utilization of solid waste with an integrated variant for utilizing and/or removing liquid waste consists of four modular method increments which may be realized by modules as a function of capacity and/or at different sites.

In a first increment of the method, any visually and manually detectable components such as metal, glass, plastic, paper, cardboard and/or compound materials are selected from mixtures thereof and other materials.

To this end, the flow of material to be treated is transmitted from a receiving unit to a drying drum. This drying drum is structured as a rotating tube of a process-specific interior configuration for transporting the waste material in the longitudinal direction off the tube. Heated air for removing water and moisture from the material is blown into the drying tube in a direction opposite the direction of the material flow. The exhaust air laden with water vapor and volatile materials is fed to a biofilter (as an auxiliary system) for cleansing. The dried material I then fed by way of a chute into subsequent sifting drum. This is a structured as an internal rotating drum with predetermined perforations and arranged in a stationary closed outer drum into which the sifted fine scrap is dropping and is moved out of it in the longitudinal direction of the drum. The dried and thus substantially deodorized coarse scrap freed of any small parts and mineral dirt such as sand and earth is then conveyed to a sorting belt for manual and/or automatic sorting. The classes of materials thus prepared in the first increment of the method are collected in separate collection systems on the same plane and are removed for conventional utilization in a pourable or compressed state. In a second increment of the method, unsorted material is pre-shredded and substantially separated from mineral components. Ferrous and non-ferrous metals are removed separately from the further processing sequence and conveyed for conventional utilization. Thereafter, applying the exhaust gas from the fourth process increment, residual moisture is extracted from the material in a further dryer, and the exhaust air is fed to a biofilter mentioned in connection with the first process increment.

The dried material is then moved to a sieving drum the mesh gage of which in this second sieving stage is 50% smaller than in the first sieving stage. The fine scrap is then subjected to floatation.

The floatation consists of a vat with an inclined bottom. Within the bottom, there are pressurized air nozzles of defined spray characteristics for whirling the material to be floated. Above the bottom, the floating mixture stands up the upper margin of a receiving furrow positioned opposite the material input. The material is input at the position of the vat where the bottom is highest. As a result of the inclination of the bottom, the injected pressurized air and the floatation water fed in from the input end, material will flow toward the lower end of the bottom. Sandy and granular material will collect here within a groove which is removed to the exterior and which may be used for construction purposes.

The organic material which has been separated by floatation collects in the receiving furrow from where it is removed and compacted and homogenized as briquettes. The overflowing floatation water and dripping water from the material feed line flow to a central water circuit including water treatment (as an auxiliary system). The remaining pre-shredded mixed material from which the mineral parts have been removed is shredded into smaller pieces at a further shredding stage and further metallic components are separated, the result being a process-specific defined shredded material as required, and particularly suited, for further process steps and which consists almost exclusively of organic materials.

This material is fed, together with the material from the floatation, to the compacting and homogenizing unit to be formed into briquettes. The quantity fed and its moisture are measured by the conveyor scale. By adding water-containing substances such as biological sludges and/or other slurries, under the control of a process computer, the moisture-content of the material is adjusted to a level appropriate for the process. Briquetting causes the temperature of the material (compaction material) to rise to about 150° C. As a result, the material is sterilized and homogenized; it is also solidified. Protected from climatic conditions, the briquettes can be stored over extended periods.

In a third increment of the method, the material thus processed from waste to briquettes is converted into a tar-free kinetically usable gas suitable for operating power plants as well as fuel cells, for instance in molten carbonate fuel cells (MCFC). Suitable gasification reactors would be fixed bed shaft gasifiers in which the gasification is carried out by a multi-zone process combining decreasing and increasing gasification and/or two decreasing steps of gasification of low negative pressure of about 100 to 300 water gage. The briquettes are fed into the reactor by way of a rotary vane feeder. The oxygen required for the process is fed through openings in the upper section of the reactor and pipe conduits extending far into the interior of the reactor and provided at their lower end with distribution devices. Depending upon the process, the oxygen may be provided as a mixture of air and/or oxygen and/or water vapor. The water vapor is generated in the annular gap surrounding the core of the reactor, by feeding water from the exterior into it which at about 500° C. spontaneously evaporates to superheated steam. Through pipes, the superheated steam is fed to the lower section of the gasification zone to establish therein a substantially uniform temperature distribution. Air is fed into the lower section of the reactor core by way of several air nozzles in order to fuse the lower portion of the coke bed by oxidation and/or gasification. The bottom of the gasifier is of conical configuration with the tip of the cone pointing upwardly. Its lower end terminates in a movable grid for the removal of ashes. The reactor gas is removed laterally from the reactor through a pipe below the reactor after it has passed over the bed of coke. Thereafter, the gas is rapidly cooled, intensively scrubbed and dried to comply with gas utilization requirements. The heat diverted from the cooling of the gas is used for generating heat energy by way of heat exchangers. The cooling, drying, floatation and scrubbing water of the process is reconditioned and recycled. Dirt and contaminants are removed from the water and added to the material to be gasified prior to its briquetting. Measuring sensors mounted at certain positions within the reactor for measuring various parameters such as pressure, temperature, mass flow, filling levels and the chemical composition of the produced gas, control the quantity of air and vapor as well as of the input.

In a fourth increment of the method, the gas thus produced may be used for direct combustion for generating heat and/or for generating electricity by powering a combustion engine coupled to a generator with utilization of the heat dissipated by the gas production, engine cooling and engine exhaust, and/or for generating electricity by oxidation of the oxidizable components of the gas by a catalytic process in a fuel cell such as, for instance, a MCFC and/or for utilizing the heat derived from the air dissipated by the fuel cell by heat exchangers.

For practicing and optimizing the method the scrubbing and floatation water required therefor, as well as the water derived from the drying steps, are fed through a circuit and are recycled after treatment in a water treatment system.

The water treatment system is provided with several different chambers such as an initial receiving chamber including a measuring station for recording process-specific parameters, a subsequent sedimentation chamber for sedimenting substances and a subsequent volatile substance separator having an upper pipe nipple as an input which is equipped with a coalescence separator consisting of a pipe with an internal wire mesh on the relatively large surface of which small droplets of volatile substance dispersed in the water will attach and form larger drops which due to their buoyancy will separate and float upwardly. By a series connection of such volatile substance separators the concentration of volatile substances in the water may be reduced to less than 5.0 mg/l. Furthermore, the water treatment system is provided with a mixing and dispensing chamber including a stirring device for precipitating suspended and dissolved substances by precipitants and flocculants.

Moreover, the exhaust air is being cleansed of dust as well as volatile organic and inorganic substances by biofilters, by mechanical or electrostatic filtration, and organic and inorganic substances are biologically metabolized by microbes, the microbes being applied in a dispersion on a structuring support such a straw or dried heather. In case of low moisture in the biofilter, water and nutrient solutions are injected into the filter by means of spray nozzles.

The advantages of the method in accordance and its realization by the apparatus in accordance with the invention are not only the high and almost complete waste utilization and low emissions, but, more so, the assured destruction of ultra toxins and other halogenated organic substances which can otherwise be achieved only by high temperature incineration systems.

By using the dissipated heat from the gasification process and/or from the energy generating process for the drying stage, primary energy is not required for practicing the method.

The modular construction of the devices for practicing the method makes possible their installation at various separated sites.

It has been found that economical operation of the method in accordance with the invention is possible with input quantities as low as about 40,000 t/a.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

FIG. 7 schematically depicts the structure of the overflows with wire mesh;

FIG. 8 schematically depicts another variant of the overflows; and

Figure 1:
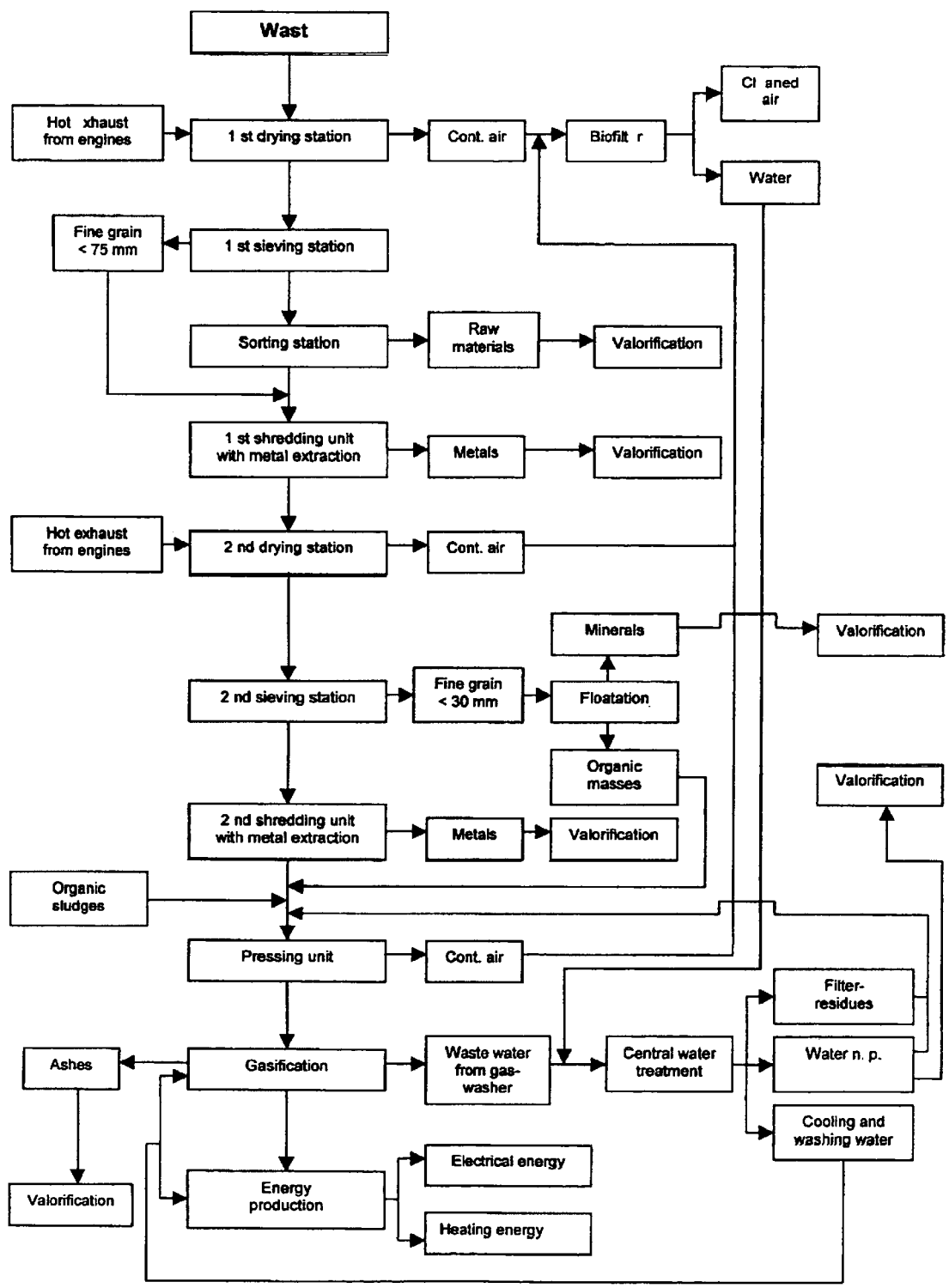
FIG. 1 is a flow diagram of the method in accordance with the invention.
Figure 2:
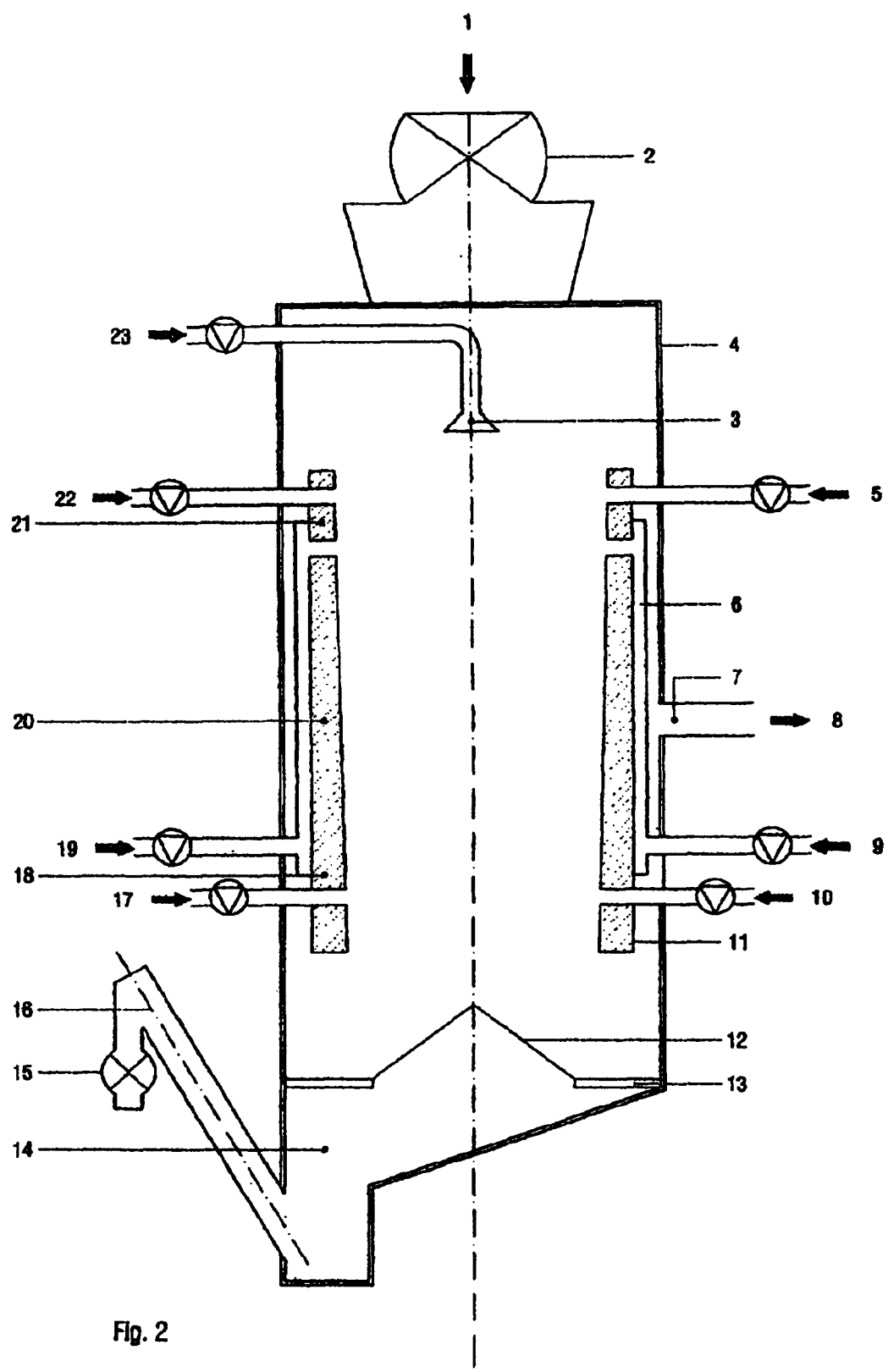
FIG. 2 is a view in longitudinal section of a gasifying reactor.
Figure 3:
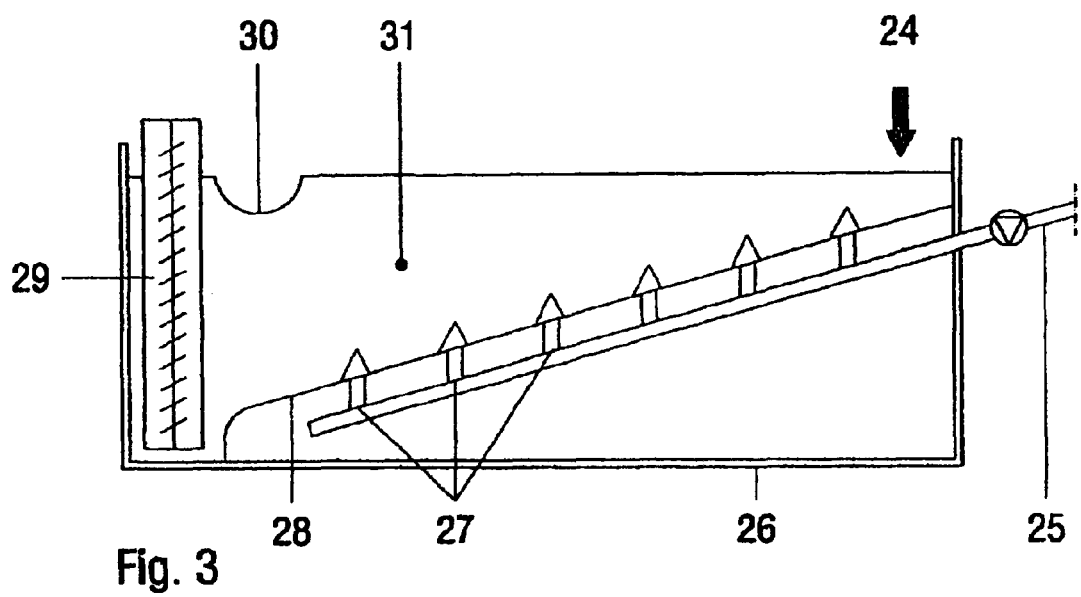
FIG. 3 is a view in cross-section of a floatation device.
Figure 4:
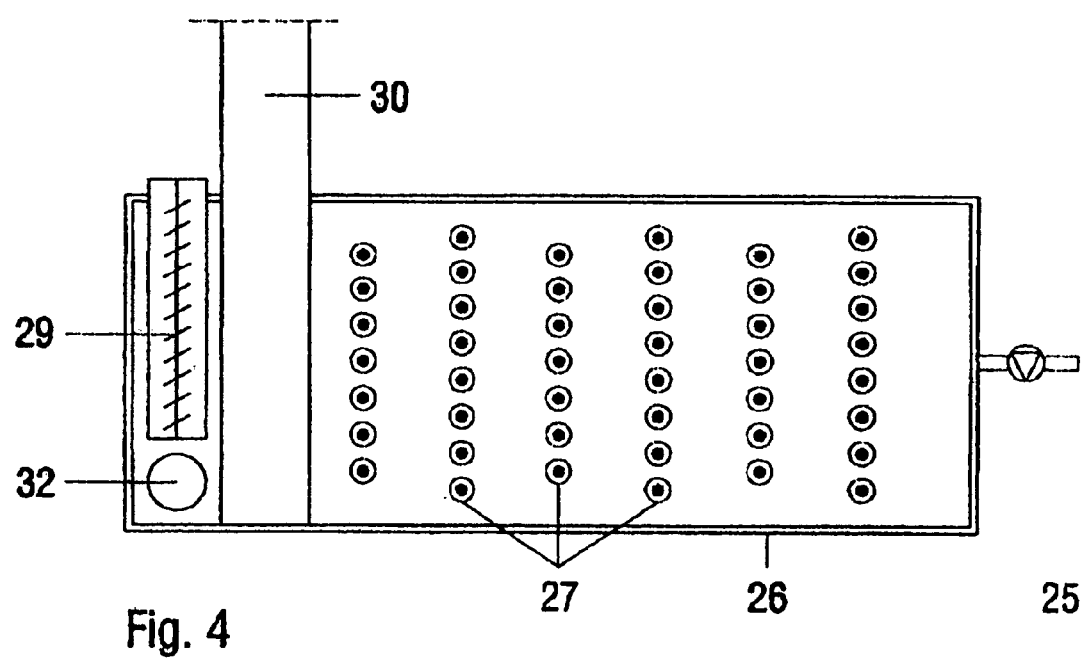
FIG. 4 is a top elevational view of the floatation device of FIG. 3.
Figure 5:
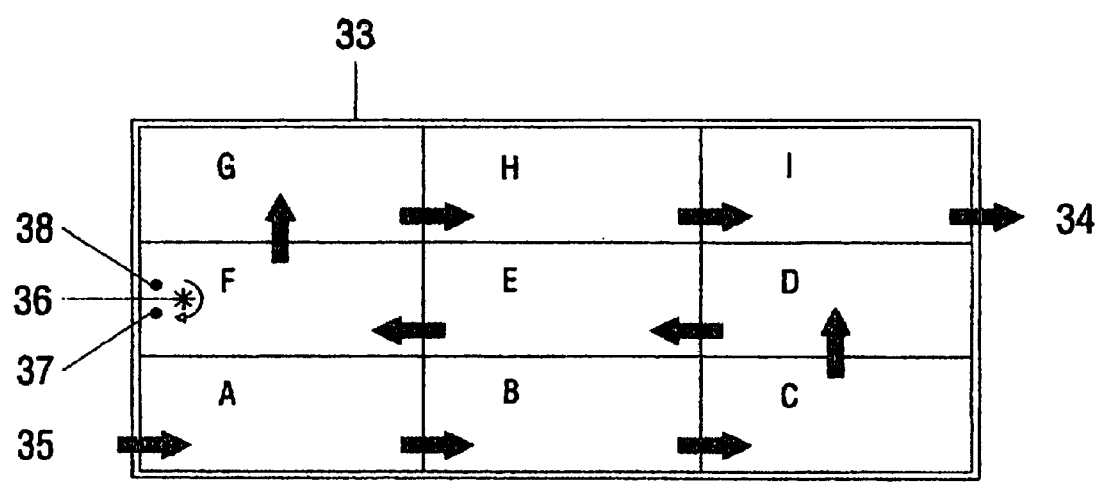
FIG. 5 is schematic view in top elevation of a water treatment system.
Figure 6:
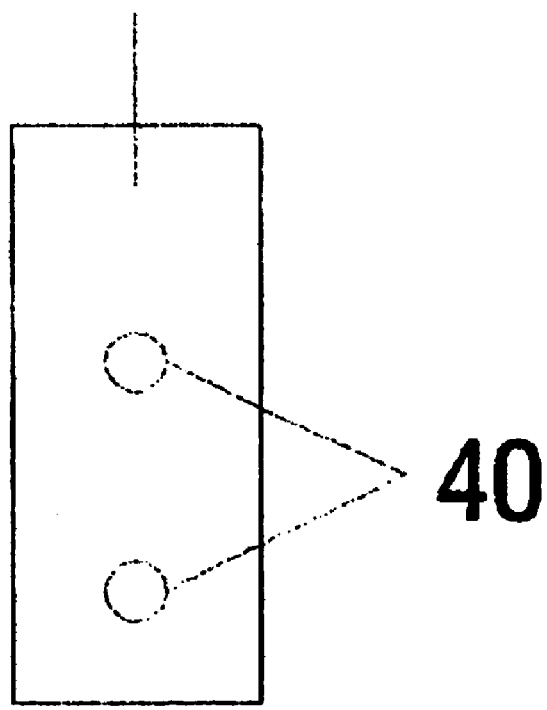
FIG. 6 is a view of a separation wall of the water treatment system with overflow openings.
Figure 9:
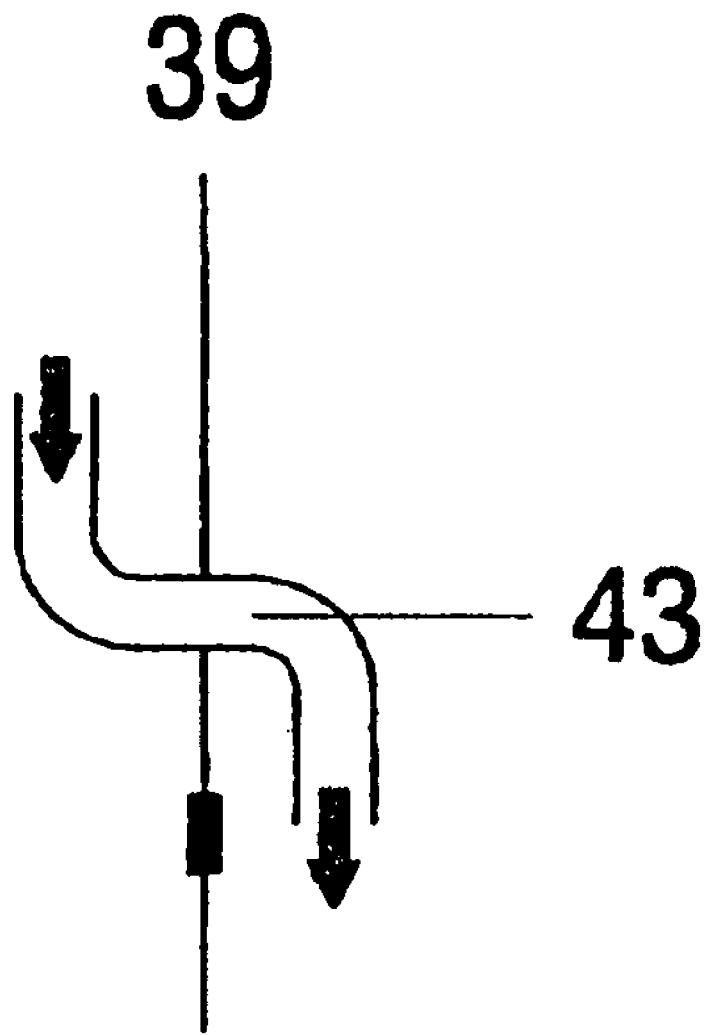

FIG. 9 schematically depicts a further variant of the overflows.

DETAILED DESCRIPTION OF THE PREFERRED EMBODIMENT

The apparatus for practicing the method in accordance with the invention essentially consist of modularly constructed main components, viz. receiving device, device for pre-drying, device for advance sieving, device for the separation of metal, a sorting device, collection containers of a collection system, pre-shredder with a device for separating metal, a drying device, a sieving device, an after-shredder with a device for separating metal, a floatation device, a briquetting device, a biofilter, a water treatment device, conveyor devices, gas generating reactor, a combustion engine coupled with an electric generator, a burner for the direct generation of heat or fuel cells for gas oxidation.

From the receiving device, the flow of material to be processed is fed to the pre-drying device.

The pre-drying device is a rotating tube having an interior structure specific to the process for transporting the waste material in the longitudinal direction of the tube. It is provided with inputs and outputs for heated air. The exhaust air laden with water vapor and other volatile substances is fed to the biofilter (as an auxiliary system) for purification. The biofilter contains mechanical and electrostatic filter elements as well as cultures of microbes and spray nozzles for water and/or nutrient solutions for injection into the filter.

The device for pre-drying is connected to a device for pre-sieving by way of a chute. The pre-sieving device is structured as a drum of predetermined perforation rotatably mounted within a stationary closed drum. A sorting device with a sorting belt and several equal-level storage containers follow the pre-sieving device.

In the sorting device, by means of the conveyor belt, visually and manually detectable components are selected from mixtures of materials and separated by classes, such as metals, glass, plastic, paper, cardboard, and/or composite materials.

A device for pre-shredding materials not sorted out follows the sorting device. The pre-shredding device is preferably provided with a device for separating metallic components. After the pre-shredding device, there follows a second drying device provided with a biofilter structured substantially identically to the first drying device. The dried material is conveyed, by a chute, to a second sieving or sifting device structured similarly to the first one, except that for the gage of its mesh which is reduced by 50% relative to that of the first sifting stage. The second sifting device is connected by respective conveyor belts to a floatation device and a compacting or pressing device.

The floatation device consists of a floatation vat 26 provided with an inclined bottom 28. Pressurized air nozzles 27 of predetermined spray characteristic are mounted in the bottom 28, for whirling of the material to be floated. Opposite its material input 24, the vat 26 is provided with a collection groove or furrow 30 as well as with conveyor screws 29 and 32 for any sediments. The pressing device and homogenizing device for briquetting is connected to the collection furrow 30 by way of a conveyor weigher or scale and moisture sensor. The conveyor scale and the moisture sensor are connected to a process computer provided with a dispensing device for adding liquids and/or slurries.

The gasification reactor follows the briquetting device. The gasification reactor is preferably a fix-bed shaft gasifier. It is provided with a rotary vane feeder 2 for briquettes. In the upper section of the reactor, there are provided pipe conduits 5, 22, 23 as well as conduits with distributing devices for air and water vapor which extend far into the interior of the reactor. The core of the reactor is lined with ceramic material and is surrounded by a shell such that a water-tight annular gap 6 is formed which is provided with a water inlet opening 9.

Several air inlets 10, 7 are provided in the lower section of the gasifier. The bottom 12 of the gasification reactor is structured conically with the tip of the cone extending upwardly. The lower end is closed by a movable grid 13 for removal of ashes by way of a lock 15. The gas is removed from the reactor laterally thereof by a pipe 8 below the reactor and into devices for cooling, scrubbing and drying. These devices are in turn connected by appropriate pipe systems with a water treatment system for treating the water. For controlling the quantities of air and vapor as well as of the input 1 measuring sensors 3, 7, 14, 18, 20, 21 are provided for different parameters, such as pressure, temperature, mass flow, filling level and chemical composition of the produced gas in the gasification reactor, In the first method increment, the visually and manually detectable components of mixtures thereof and of other materials are selected by known methods in accordance with classes of materials such as metal, glass, plastic, paper, cardboard and/or composite materials. To this end, the flow of waste material is moved into a pre-drying device from a receiving device.

The pre-drying device is structured as a rotatable drum of an internal structure specific to the process for moving the waste material in a direction longitudinal of the drum. In a direction opposite the movement of the waste material, heated air is blown into the drying drum for extracting water, moisture and other volatile substances from the waste material. The exhaust air laden with water vapor and other volatile substances is fed to a biofilter (as an auxiliary system) where it is purified. The dried material is then fed by way of a chute to a down-stream pre-sieving device. The pre-sieving device is structured as an internal rotatable drum of predetermined perforation and is mounted within a stationary closed housing into which the sifted out material will drop and from which it will be removed in the direction of the drum. The dried and thus substantially deodorized coarsely shredded material from which mineral dirt, such as soil and sand, have been removed is then transferred to a conveyor belt after ferrous and non-ferrous metals have been separated from it, the sorting being carried out manually.

The different classes of material thus processed in the first increment of the method, are taken up by separate coplanar collection system and are transported, either as bulk material or in a compressed state, for conventional salvaging.

In the second increment of the method material which has been sorted out is pre-shredded to a grain size of about 150 mm to 250 mm and is separated as far as possible. Ferrous and non-ferrous metals are removed from further processing for conventional utilization. Thereafter, residual moisture is extracted from the material in a further drying device by applying the exhaust gas from the fourth increment of the method. The exhaust air is fed to the biofilter referred to in connection with the first increment of the method.

The dried material is then fed to a second sieving device the mesh gage of which is reduced by 50% relative to that of the first sieving device. This is followed by a further device for removing metal to take out any residual ferrous and non-ferrous metals.

The fine grain is then moved a floatation device. The material enters the floatation vat 26 at that the highest position of the inclined bottom 28 thereof. As a result of the inclination of the bottom 28, injected pressurized air at the air input 25 and of the floatation water mixture 31 at the input end, material flows toward the lower end of the bottom 28. Sandy and granular material which collects there is remove by the conveyor screw 29 and may be used as construction material. The organic material floated out collects at a collection furrow 30 from where it is removed to the briquetting device for compacting and homogenizing.

The overflowing floatation water and dripping water from the material on the conveyor flows to a center water circuit including a water treatment facility (as an auxiliary system). Any remaining pre-shredded material mixture from which mineral components have been removed is further shredded in at further shredding stage and metallic components are removed therefrom. The result is a process-specific shredded material which is required and particularly suited for further process steps and which consists almost exclusively of organic substances.

Together with the material from the floatation device, this material is moved to the briquetting device for compacting and homogenizing. Its moisture content and flow rate may be measured by a conveyor scale. By adding water-containing materials such as, for instance, organic sludges or other slurries, which is controlled by a process computer, the moisture of the material is set as required by the process. During briquetting the temperature of the material (compacting material) rises to about 150° C. This sterilizes, homogenizes and solidifies the material.

In the third increment of the process the material thus salvaged by the process is converted as briquettes a kinetically usable tar-free gas which as well as for power plants may be used for fuel cells such as, for instance, molten carbon fuel cells (MCFC). A fixed bed shaft gasification reactor is suitable as a reactor in which gasification takes place in multiple zone by a combination of lowering and rising gasification and/or of two lowering gasifications at a low negative pressure of about 100 to 300 mm water gage. The briquettes are moved into the reactor by the rotary vane feeder 2. The oxygen required for the process, which depending upon the process parameters typically is a mixture of air and/or oxygen and/or water vapor, is fed into the reactor through air and steam openings 5, 22, 23 at the upper section of the reactor and by pipe conduits provided with distributor devices at their lower ends which extend into the interior of the reactor and thus into the center of the gasification zone. The water vapor is generated in the annular gap 6 of the inner sheath surrounding the reactor chamber by feeding water into the gap 6 through water inlets 9, 19 which at about 500° C. spontaneously evaporates into superheated steam. Which is directly fed into the lower section of the gasification zone. It leads to a substantially uniform temperature distribution in the entire gasification zone. Air is fed into it by way of air inlets 10, 17 in the lower section of the gasification reactor for fusing the lower portion of the coke bed by oxidation and/or gasification. The bottom of the gasification reactor is structured conically. The tip of the cone points upwardly, and the lower section is closed by a movable grid 13 which serves to remove ashes 16 through a lock 15. After it has passed over the bed of coke, the reactor gas is removed laterally from the reactor by a pipe 8 below the reactor. The gas will then be rapidly cooled, intensively scrubbed, and dried to satisfy requirements of gas utilization. The cooling and scrubbing water of the process is treated and recycled. The washed out dirt particles are removed and added to the gasification material prior to its briquetting. The control of the quantities of air and steam as well as of the input 1 is subject to sensors 3, 7, 14, 18, 20, 21 which are mounted at certain positions within the reactor and which monitor various parameters such as pressure, temperature, mass flow, filling levels and the chemical composition of the produced gas.

In a fourth increment of the method the gas generated in the manner set forth above may be utilized for generating heat by direct combustion and/or for operating a combustion engine coupled to a generator for generating electricity. The heat exhaust from the processing of the gas, engine cooling and the engine exhaust may be utilized by way of heat exchangers for generating heat energy and/or for generating electricity by oxidation of the oxidizable components of the gas in a catalytic process by means of fuel cells such as, for instance, an MCFC. The exhaust heat from the fuel cell may also be used by way of a heat exchanger. To optimize the method, the water required for scrubbing, cooling and floatation, as well as the water from the drying stages, are maintained within a closed circuit and is subjected to a water treatment facility for re-use.

The water treatment facility consists of a container 33 provided with an inlet 35 and an outlet 34 and with a plurality of different chambers A–I separated by walls 39 provided with overflows 40, 43. The first or inlet chamber A is provided with sensors 37, 38 for recording process-specific parameters. It is followed by several sedimentation chambers for sedimenting substances and with a subsequent precipitator 41, 42 for volatile substances, with an upper pipe nipple as an inlet 41 provided with a coalescence precipitator. The coalescence precipitator consists of a pipe and wire mesh. Small dispersed droplets of volatile substances precipitate on the wire mesh and united to larger drops which separate and owing to their buoyancy rise. By series-connected coalescence precipitators of this kind it is possible to reduce the concentration of the volatile substance to less than 0.5 mg/l. One of the chambers is structured as a mixing and dispensing chamber provided with a stirring device 36 for precipitating floating and dissolved substances by means of precipitants and flocculants. The exhaust air from the dryers and from the sieve dryers is purified by removal of dust and organic and inorganic substances in down-stream biofilters. The dust is mechanically filtered out as a result of the biological structure, and organic and inorganic substances are filtered out biologically by being metabolized by the microbes. The microbes are applied in dispersion to a structure-forming support material such as straw or dried heather. In case of low moisture in the biofilter, water and dissolved nutrients are fed into the biofilter by spray nozzles.

What is claimed is:

1. A method of treating and utilizing solid and liquid waste materials and mixtures thereof by salvaging the organic substances thereof for high-yield generation of energy, comprising:

a first increment of removing from the mixture of waste materials visually and manually detectable components and of separating them according to classes such as metal, glass, plastic, paper, compounds, composite materials and others, initially subjecting the stream of material to be processed to pre-drying in a drying device and purifying the exhaust gas laden with water vapor and vaporizable materials by a (hereafter "biofilter"), removing from the substantially deodorized material in a first sieving device mineral dirt such as sand, earth and small pieces, removing iron and non-ferrous metals in a metal separator and separating them manually or by automatic systems on a sorting conveyor belt, storing the sorted materials according to material classes in separate equal-level collection containers for transport to conventional salvaging facilities;

a second increment including reducing the non-sorted remaining material to a granular size of about 150 mm to 250 mm and extracting therefrom, separated as iron and non-ferrous metals, any further metallic components, removing from the material any residual moisture in a second drying device and thereafter subjecting the material to a second sieving stage having a mesh size 50% smaller than that of the first sieving device and floating the sifted material in a floatation, subjecting the material thus freed of any metal scrap to compaction and simultaneously further reducing the sifted residue for removing any further metallic components, combining the further reduced material with the floated material such that the remaining material is almost exclusively organic, increasing the moisture content of the organic material thus obtained from the floated and the further reduced materials to a level specific to the process by a computer-controlled addition of fluid such as biological sludges and other slurries and parameters determined by moisture sensors and conveyor scales, compaction to Briquettes such it leads to heating of the material composition to more than 150° C.;

a third increment of producing an energetically useful tar-free gas from the thus-produced briquettes by means of a gasification reactor at a gasification temperature of about 300° C. to 450° C. and by passing the gas over a burning bed of coke of a temperature of about 1,000° C. to 1,400° C. by initially feeding the briquettes thus produced to the gasification process by means of a rotary vane feeder as well as oxygen from the air and/or water vapor, the water vapor being produced in an annular gap between the inner and outer shells of the gasification reactor and distributed through openings in the upper and lower sections of the gasification reactor sections as well as through distribution devices in the reactor, the amount of the water vapor being controlled by sensors mounted within the reactor for monitoring pressure, temperature, mass flow and chemical composition of the gas, the gas, following passage over the conveyor weigher or scale, being diverted through openings below the gasification reactor and being thereafter rapidly cooled to 30° C. to 60° C., scrubbed and dried; and a fourth process increment of directly generating from the gas heat energy by means of a gas burner and/or generating electric energy by means of a combustion engine coupled to a generator and heat energy from the hot exhaust of the gas treatment, engine cooling and engine exhaust gas and/or catalytically generating electric energy in a fuel cell by oxidizing oxidizable components contained in the gas and by way of heat exchangers utilizing the hot exhaust from the fuel cell exhaust air as heat energy.

2. The method of claim 1, further comprising:

an auxiliary process increment of processing the cooling water, the drying water from at least one of the exhaust air, the exhaust vapor and the scrubbing water in a water treatment system in a closed water circuit, with the dirt mixtures thus generated being added as input material to the material prior to its pressing to Briquettes and the exhaust air being purified in a biological filtration device.

3. An apparatus for practicing the method of claim 1, comprising:

a receiving unit, a device for pre-drying, a device for pre-sieving, a device for separating the metal, a sorting device, a collection container system including storage containers, a pre-shredder including a device for metal separation, a drying device, a sieving device, an after-shredder including a metal separation device, a floatation device, a briquetting device, a biofilter, a water treatment device, conveyor systems, gasification reactor, combustion engine with an electric generator, burner for the direct generation of heat or a gas oxidation or fuel cell, the briquetting device connected by a conveyor system with a gasification reactor, which is a fixed-bed shaft reactor and which is provided with a rotary vane feeder for the briquettes and into the upper reactor section of which pipe conduits and pipe conduits with distributor systems for air and/or water vapor and/or gas are entering, the reactor core being lined by ceramic and clad such that a water-tight annular gap is formed which is connected to the water input, a plurality of air inputs being provided in the lower section of the reactor core and the bottom of the gasification reactor being conically structured with the tip of the cone pointing upwardly and the lower end being closed by an annular moveable grid for removing ashes by means of a lock, a pipe being arranged below the reactor core laterally thereof and connected to an opening in the outer surface of the gasifier, the opening being in turn connected by a pipe to a gas cooler, gas scrubber and a gas dryer, measuring sensors for monitoring different parameters such a pressure, temperature, mass flow, filling levels and chemical composition of the produced gas being provided in the gasification reactor for the control of air and vapor quantities, the water treatment system consisting of containers with input and output channels being provided with a plurality of chambers divided by separating walls with overflows, such as the input chamber with measuring sensors for detecting process-specific parameters and several subsequent sedimentation chambers for sedimenting materials and a subsequent further volatile substance separator having an intake by way of an upper pipe nipple with a coalescence separator water and/or nutrient solutions for injection into the made of a pipe with an internal wire mesh, one of the chambers being structured as a mixing and measuring chamber with a stirring device for precipitating suspended materials and dissolved materials by precipitants and flocculants, and a biofilter at the output of the first and second drying devices equipped with filter cloths and/or other biological structures and/or centrifuge and/or electrostatic structural elements, microbes being also present on a structure forming support material for metabolizing organic and inorganic materials, and with spray nozzles biofilter.

* * * * *